(12) United States Patent
Shelby et al.

(10) Patent No.: US 11,228,339 B2
(45) Date of Patent: Jan. 18, 2022

(54) COMPREHENSIVE SYSTEM DESIGN TO ADDRESS THE NEEDS FOR VIRTUAL SEGMENTATION OF THE COAXIAL CABLE PLANT

(71) Applicant: Coherent Logix, Incorporated, Austin, TX (US)

(72) Inventors: Kevin A. Shelby, Austin, TX (US); Michael B. Doerr, Hampton Falls, NH (US)

(73) Assignee: Coherent Logix, Incorporated, Austin, TX (US)

( * ) Notice: Subject to any disclaimer, the term of this patent is extended or adjusted under 35 U.S.C. 154(b) by 13 days.

(21) Appl. No.: 16/781,099

(22) Filed: Feb. 4, 2020

(65) Prior Publication Data

US 2020/0252102 A1 Aug. 6, 2020

Related U.S. Application Data

(60) Provisional application No. 62/801,026, filed on Feb. 4, 2019.

(51) Int. Cl.
*H04B 3/04* (2006.01)
*H04L 12/911* (2013.01)

(52) U.S. Cl.
CPC .............. *H04B 3/04* (2013.01); *H04L 47/70* (2013.01)

(58) Field of Classification Search
CPC ...... H04B 3/04; H04B 7/185; H04B 10/2575; H04J 1/00; H04J 3/16; H04L 9/00; H04L 12/26; H04L 12/28; H04L 12/911; H04L 47/70; H04N 21/61
USPC .............. 370/229, 431, 468; 375/257, 298; 725/111, 127, 129
See application file for complete search history.

(56) References Cited

U.S. PATENT DOCUMENTS

| 7,336,680 | B2 | 2/2008 | Sorenson et al. |
| 8,335,226 | B2 * | 12/2012 | Kolze ................. H04W 52/225 370/431 |
| 9,369,339 | B2 * | 6/2016 | Bernstein ............ G06F 9/45558 |
| 2006/0262722 | A1 | 11/2006 | Chapman et al. |

(Continued)

OTHER PUBLICATIONS

International Search Report and Written Opinion for International Application No. PCT/US2020/016526, dated May 4, 2020, 11 pgs.

(Continued)

*Primary Examiner* — Shawkat M Ali
(74) *Attorney, Agent, or Firm* — Kowert, Hood, Munyon, Rankin & Goetzel, P.C.

(57) ABSTRACT

Methods and devices for dynamically designated first and second subsets of a plurality of frequency channels as upstream and downstream channels, respectively, for performing wired communications using virtual segmentation between a network controller and an endpoint device. performing virtual segmentation to service an endpoint device. Communications are performed between the network controller and the endpoint device through a wired communication medium using the upstream and downstream channels. The first subset and second subsets of the plurality of channels are designated as upstream channels and downstream channels, respectively, based at least in part on one or both of upstream and downstream channel demand and channel availability.

19 Claims, 7 Drawing Sheets

(56) References Cited

U.S. PATENT DOCUMENTS

| | | | | |
|---|---|---|---|---|
| 2010/0158049 A1* | 6/2010 | Howard | ................... | H04J 1/00 |
| | | | | 370/480 |
| 2011/0185263 A1* | 7/2011 | Chapman | ............ | H04L 12/2861 |
| | | | | 714/776 |
| 2013/0332978 A1 | 12/2013 | Rakib | | |
| 2013/0347049 A1* | 12/2013 | Riggsby | .................. | H04B 3/38 |
| | | | | 725/127 |

OTHER PUBLICATIONS

Technitix, "Virtual Segmentation", Whitepaper, Technetix Group Limited, Feb. 2018. Available from: https://americas.technetix.com/en/virtual-segmentation, 6 pgs.

CableLabs, "DOCSIS 3.1 Physical Layer Specification", CM-SP-PHYv3.1, Ver. I16, Jan. 2019. Available from: https://specification-search.cablelabs.com/CM-SP-PHYv3.1, 234 pgs.

\* cited by examiner

COMPREHENSIVE SYSTEM DESIGN TO ADDRESS THE NEEDS FOR VIRTUAL SEGMENTATION OF THE COAXIAL CABLE PLANT

PRIORITY CLAIM

This application claims benefit of priority to U.S. Provisional Application No. 62/801,026 titled "A Comprehensive System Design to Address the Needs for Virtual Segmentation of the Coaxial Cable Plant" and filed on Feb. 4, 2019 which is hereby incorporated by reference in its entirety as if fully and completely set forth herein.

FIELD OF THE INVENTION

The present invention relates to virtual segmentation of a wired communication medium.

DESCRIPTION OF THE RELATED ART

Wired communication media such as coaxial cables and power line carriers (PLCs) are widely deployed to deliver wired communications to electronic devices. Increasing throughput requirements of modem devices in both the upstream and downstream directions present challenges for legacy wired media to accommodate the increase in desired traffic. Accordingly, improvements in the implementation of wired communications are desired.

SUMMARY OF THE INVENTION

The above-mentioned problems are at least partly solved by the subject matter of the independent claims of the present application. Exemplary embodiments of the invention are the subject of the dependent claims.

In some embodiments, the present invention provides for a method for performing virtual segmentation to service an endpoint device. A plurality of channels are designated within a range of frequencies, wherein each of the plurality of channels comprises a separate sub-band of frequency within the range of frequencies.

A first subset of the plurality of channels are designated as upstream channels and a second subset of the plurality of channels are designated as downstream channels for virtual segmentation. Communications are performed between a network controller and the endpoint device through a coaxial cable by utilizing the plurality of channels.

In some embodiments, the first subset of the plurality of channels are designated as upstream channels and the second subset of the plurality of channels are designated as downstream channels based at least in part on one or both of upstream and downstream channel demand and channel availability.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention may be obtained when the following detailed description of the preferred embodiment is considered in conjunction with the following drawings, in which.

Figure 1:
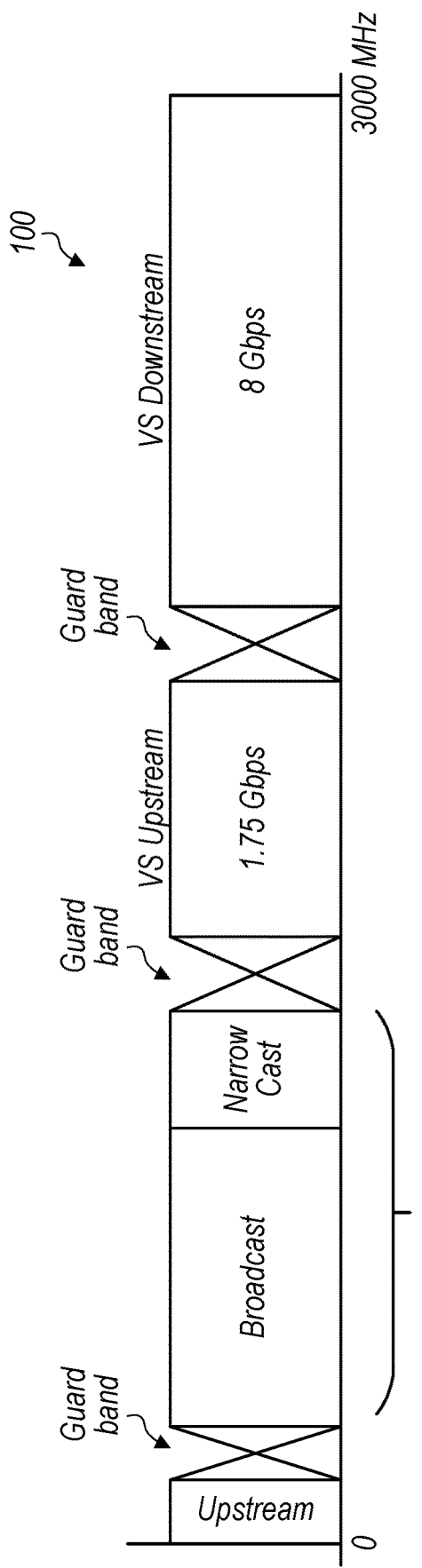
FIG. 1 is a schematic illustration of spectrum allocation for a virtual segmentation (VS) implementation that utilizes Data Over Cable Service Interface Specification (DOCSIS), according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Application Specific Integrated Circuit (ASIC)—this term is intended to have the full breadth of its ordinary meaning. The term ASIC is intended to include an integrated circuit customized for a particular application, rather than a general purpose programmable device, although ASIC may contain programmable processor cores as building blocks. Cell phone cell, MP3 player chip, and many other single-function ICs are examples of ASICs. An ASIC is usually described in a hardware description language such as Verilog or VHDL.

Program—the term "program" is intended to have the full breadth of its ordinary meaning. The term "program" includes 1) a software program which may be stored in a memory and is executable by a processor or 2) a hardware configuration program useable for configuring a programmable hardware element or ASIC.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, e.g., imperative or procedural languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element or ASIC.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless or wired protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Virtual Segmentation

In the following, some exemplary embodiments of the present invention are described in more detail, with reference to improved dynamic resource allocation and utilization in a virtual segmentation (VS) implementation.

VS divides the viable communication spectrum of a wired communication into a plurality of virtual segments that correspond to different frequency bands. Coaxial cables, for example, may be viable for use in wired communications up to a frequency of 3 GHz, or potentially even higher frequencies. In some embodiments, these virtual segments are dynamically allocated to upstream or downstream communications. In contrast to virtual segments, conventional segments may refer to different parts of the frequency pass-band in a coaxial cable or other communication medium that is fixed in hardware for upstream or downstream communications, but not both. Virtual segments, on the other hand, may be alternatively utilized for either upstream or downstream communications.

VS is a methodology that extends the frequency range typically exercised on the cable plant to enable high-speed service delivery between dedicated endpoints, at a fiber node and the remote PHY device (RPD), respectively. VS may provide extra bandwidth alongside traditional broadcast and cable modem services within a residential deployment area without the need to lay additional fiber. Embodiments herein present methods and systems for improved resource allocation and utilization in a VS implementation, or in other types of network communications.

VS Link System Design

Cable access networks have evolved to adopt a Distributed Access Architecture (DAA). This architecture permits access hardware to be relocated from the headend to smaller fiber nodes. The implementation separates the Converged Cable Access Platform (CCAP) core from PHY functionality, thereby enabling the Remote PHY (R-PHY) to be deployed closer to subscriber areas. This typically utilizes a digital optical link to provide connectivity back to the CCAP Core, requiring fiber all the way to the R-PHY. VS leverages unused spectrum at higher frequencies on the cable plant to avoid running additional fiber to the R-PHY.

Figure 2:
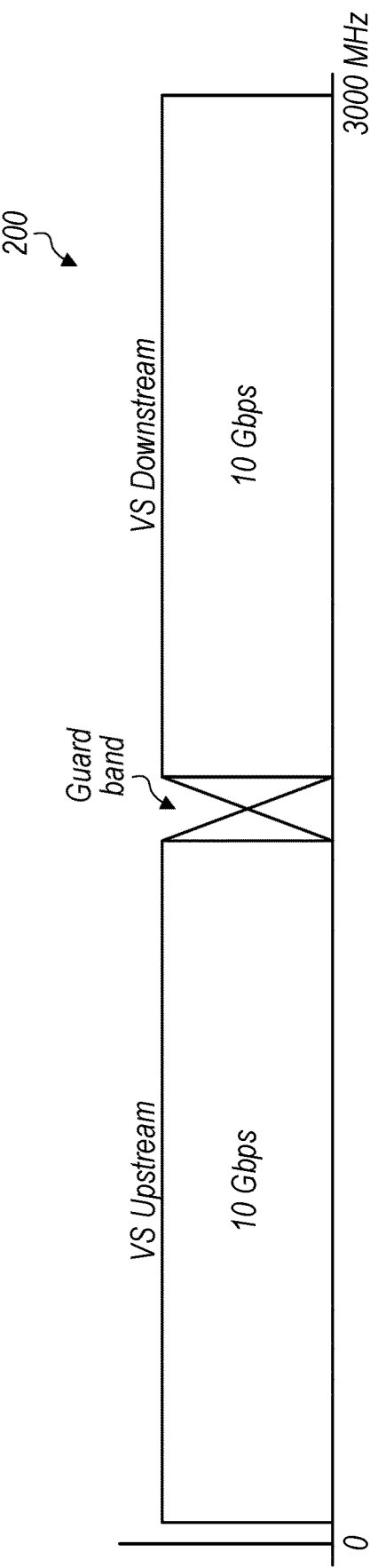
FIG. 2 is a schematic illustration of spectrum allocation for a virtual segmentation implementation that does not utilize DOCSIS, according to some embodiments.

FIG. 1 and FIG. 2 illustrate exemplary spectrum allocations with and without Data Over Cable Service Interface Specification (DOCSIS), respectively. As illustrated, when DOCSIS is utilized for the lower portion of the spectrum, VS upstream traffic may be used for 1.75 Gbps of throughput, while the higher available frequencies may be used for downstream VS traffic with 8 Gbps of available throughput. Alternatively, if DOCSIS is not present, the entire 3 GHz band (potentially with the exception of any frequencies reserved for exclusion and/or guard bands) may be split evenly between upstream VS and downstream VS.

Figure 3:
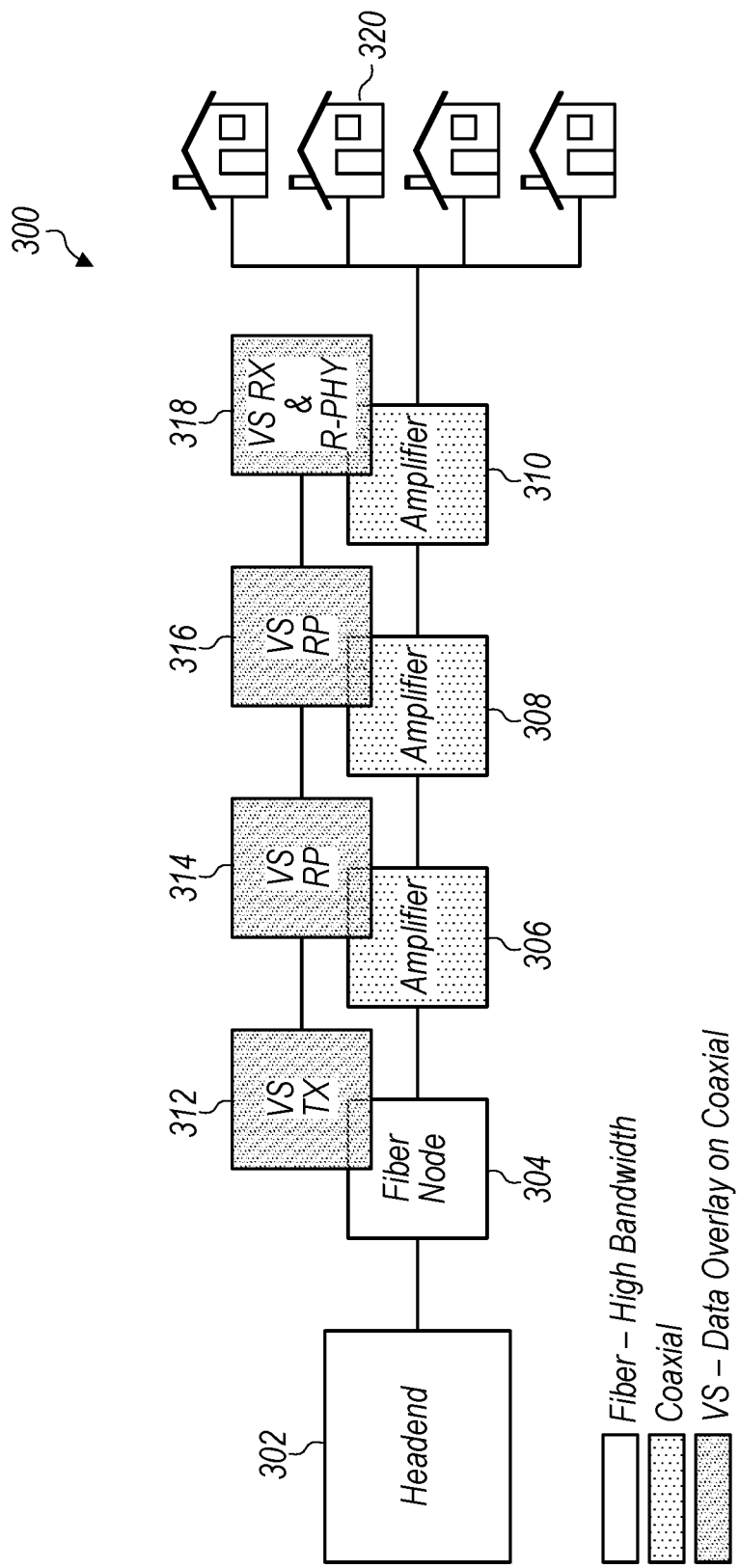
FIG. 3 illustrates a VS link connecting a fiber node (FN) to an endpoint device by a series of repeaters, according to some embodiments.

FIG. 3 illustrates a VS link connecting the Fiber Node (FN) to a R-PHY by a series of repeaters. Each repeater (RP) terminates and regenerates the signal transmission, extending the reach of high bandwidth transport deep into the subscriber area and thereby eliminating the need for fiber outlay from the FN to the R-PHY and substantially reducing the cost of node segmentation.

VS Overlay System Architecture

Figure 4:
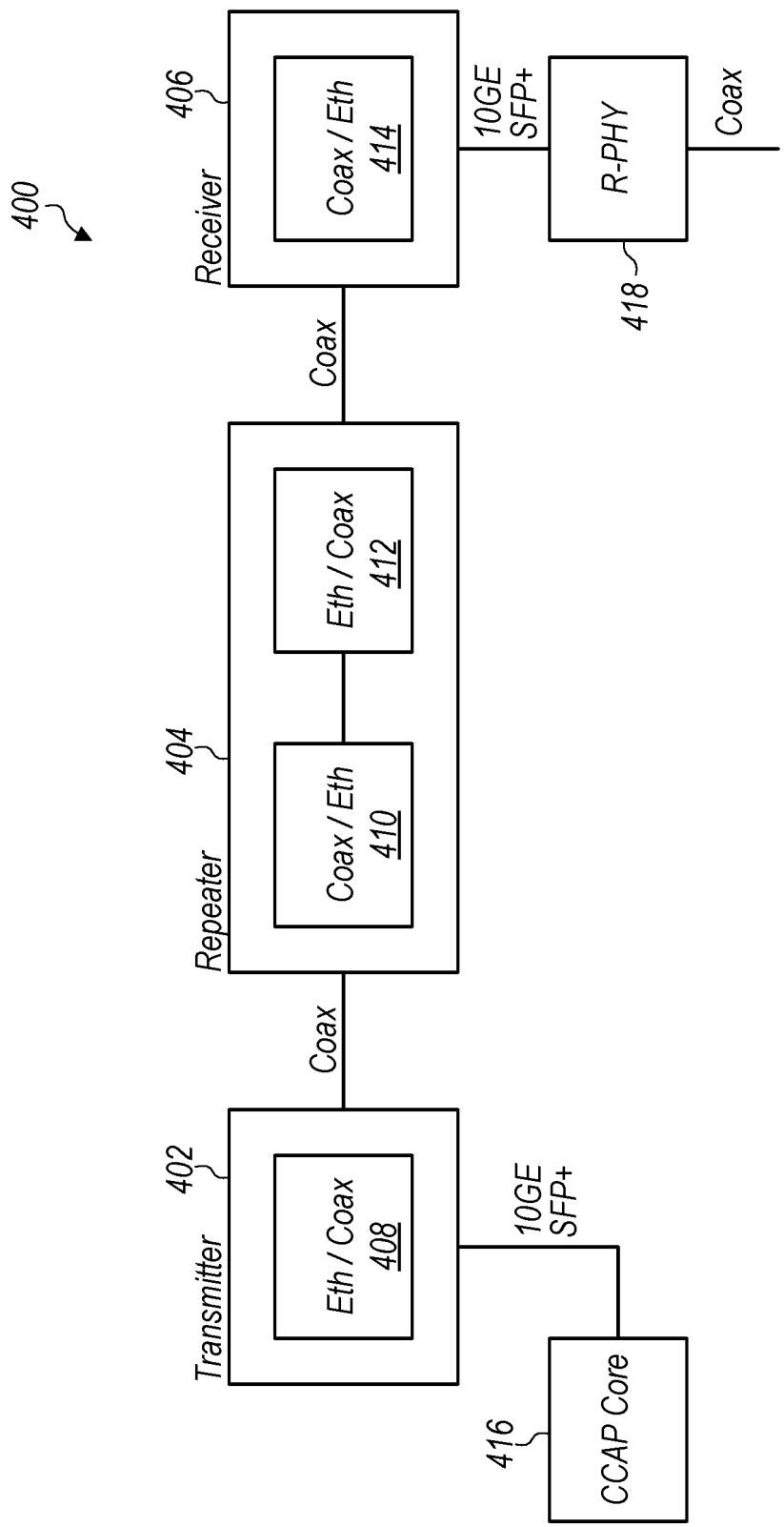
FIG. 4 illustrates an exemplary VS overlay that includes a VS Transmitter, a VS Repeater, and a VS Receiver, according to some embodiments.

FIG. 4 illustrates an exemplary VS overlay that includes three primary system components, a VS Transmitter 402, a VS Repeater 404, and a VS Receiver 406. The VS Transmitter encodes and modulates an Ethernet stream for transport over a coaxial cable via a diplexer shared with the optical node. The VS Repeater regenerates an Ethernet stream (i.e. demodulates and decodes then encodes and modulates) on the high-frequency side of respective transmit and receive diplexers on the coax interfaces shared with an Amp. The VS Repeater in either the upstream (US) or downstream (DS) direction may be considered analogous to a receiver/transmitter (RX|TX) pair connected back-to-back. Simultaneous US|DS operation involves two such RX|TX pairs, with their respective band allocations appropriately frequency division multiplexed. The VS Receiver demodulates and decodes the signal received on the high-frequency side of the diplexer on the coax interface shared with an Amp to recover the Ethernet stream on the way to the R-PHY.

Figure 5:
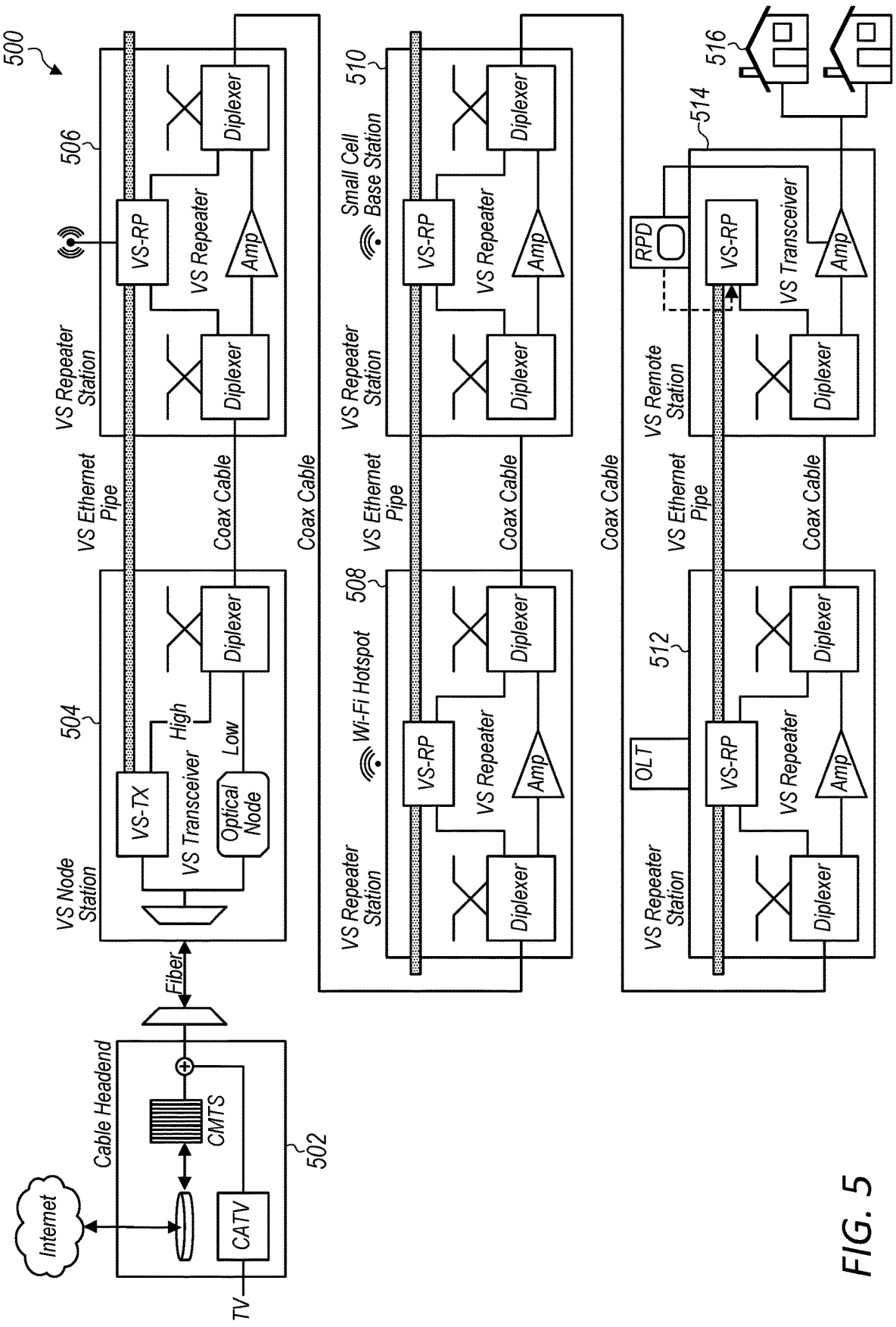
FIG. 5 illustrates an example VS system diagram that incorporates auxiliary service points, according to some embodiments.

FIG. 5—VS System Diagram

FIG. 5 illustrates an example VS system diagram that incorporates auxiliary service points, according to some embodiments. As illustrated, the VS Overlay equips each repeater with high-speed transport, to enable hosting of a variety of auxiliary services, e.g. Wi-Fi Hotspot, Small Cell Base Station, and/or Mobile Backhaul. These service points may be configured to: provide access to/from a wireless subscriber base or bridge to/from an associated wireless network. Advantageously, dynamic provisioning of high-speed services may be enabled anywhere along the way of a cable strand, again without the need to lay fiber.

In some embodiments, the auxiliary service points may be utilized in a software defined radio (SDR) implementation. Deployed as desired along the cable strand, the operating requirements of a Wi-Fi Access Point, Small-Cell Base Station, or Backhaul Transceiver may be accommodated alongside VS TX|RX processing within the same SDR processing facilities. In these embodiments, the auxiliary service points may be adapted as needed to accommodate shifting service needs or updates in the underlying wireless protocols.

While the system design outlined according to some embodiments described herein is in reference to wideband service deployment on a coaxial cable, many of the design characteristics may be extended to include other networking arrangements including Power Line Carrier (PLC) or Telephone Line Based Twisted-Pair Copper.

For any communication protocol, the system design specifies a frame structure, channelization, modulation and coding to enable efficient transport over the assigned medium, e.g. coax cable, powerline carrier, radio frequency carrier.

In some embodiments, the VS system may be designed to accommodate bandwidths up to 3 GHz or greater on the coax cable transport. The lower band edge may be adjusted to accommodate various DOCSIS deployments, i.e. 860, 1002, 1218, and/or 1794 MHz plus a guard band. In scenarios where DOCSIS is not present, the entire bandwidth out to 3 GHz or greater (e.g. 5-3000 MHz) may be utilized.

In some embodiments, addressable channel bandwidths may be defined in discrete sub-bands (e.g. 24-192 MHz in 24 MHz steps, or other bandwidths and sub-band sizes). The bands may be enumerated to maximally fill the spectrum from the lower band edge to the upper band edge (i.e. channel bandwidths may be adjusted to reduce the balance of unused spectrum). Code blocks may be assigned independently to channel bands to permit easy parallelization of the TX or RX design. In some embodiments, exclusion and/or guard bands may be configured from the set of parameterized sub-bands.

A frame periodicity may be defined (e.g. 1 ms), for which the system configuration may be changed and signaled. Bit loading may be tuned according to the available channel capacity (e.g., based on a current signal-to-interference-plus-noise (SINR) per sub-band) from the band start frequency to the band stop frequency In some embodiments, the split between upstream and downstream channel allocations may be configured on a per frame basis.

Figure 6:
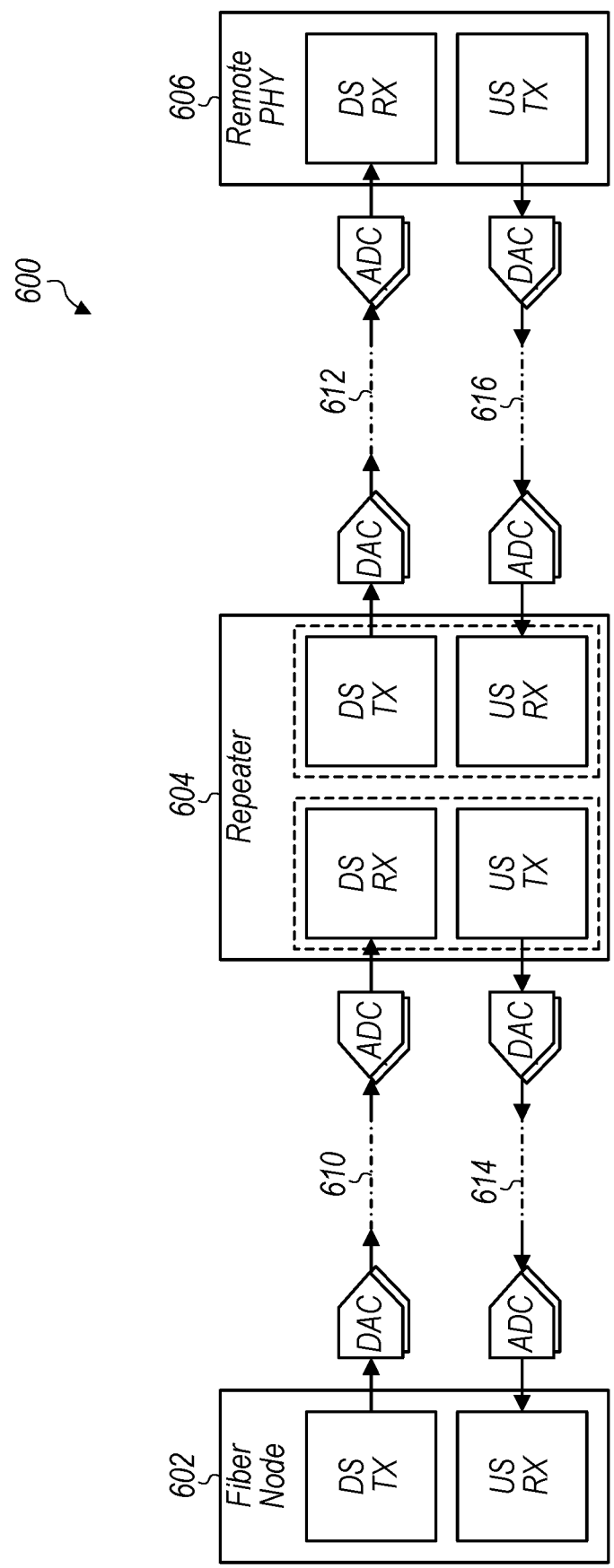
FIG. 6 illustrates a wired communication system including analog-to-digital conversion and digital-to-analog conversion, according to some embodiments.

FIG. 6—Modular System Implementation

FIG. 6 illustrates a simplified wired communication system including a fiber node 602, a repeater 604, and a remote PHY device (606), according to some embodiments. As illustrated, FIG. 6 shows how a repeater device utilizes back-to-back analog-to-digital and digital-to-analog converters to re-digitize and retransmit a received communication, thereby increasing signal fidelity.

It may be observed that there is a strong commonality in the processing requirements at the fiber node, repeater, and endpoint device. A TX|RX pair appears at each analog RF (e.g., coax) and digital (e.g., ethernet) crossing. A VS repeater may utilize two such crossings. The variation in processing load may be attributed to the respective US|DS bandwidth allocations. The TX and RX processing requirements may otherwise be the same or at least substantially similar, allowing for modular reuse of processing facilities partitioned along the lines depicted in FIG. 6, up to and inclusive of the entire channel bandwidth assigned in either the upstream or downstream direction. In other words, a plurality of processing elements of a multi-processor system such as HyperX™ may be dynamically reallocated from processing upstream or downstream communications. The processing at each TX|RX pair may be further sub-divided along assigned channel boundaries to incorporate multiple processing elements in parallel to deliver the desired system throughput. A modular approach to system design may be particularly advantageous for an SDR implementation.

Figure 7:
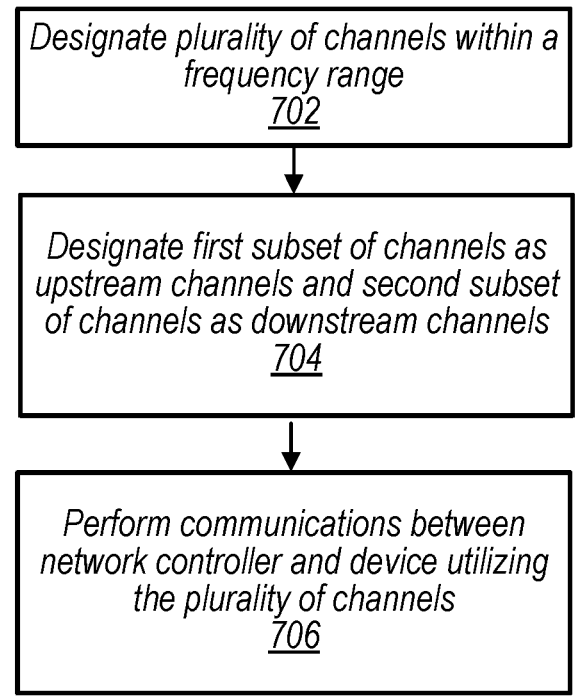
FIG. 7 is a flowchart diagram illustrating a method for performing wired communications between a network controller and an endpoint device, according to some embodiments.

FIG. 7—Flowchart for Sub-Band Allocation

FIG. 7 is a flowchart diagram illustrating a method for performing wired communications between a network controller and an endpoint device, according to some embodiments. Aspects of the method illustrated in FIG. 7 may be performed by one or more wired communication devices serving as part of a wired communication system, including for example the transmitter 402, repeater 404, and/or receiver 406 illustrated in FIG. 4, among other types of devices as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the device (e.g., processor(s) 302, baseband processor(s), processor(s) associated with communication circuitry (e.g., 330), etc., among various possibilities) may cause the device to perform some or all of the illustrated method elements. The described method steps may be performed by one or more devices to direct wired communications between a network controller and an endpoint device. For example, the network controller, the endpoint device, and/or one or more devices connected between the network controller and the endpoint device may be configured to concurrently perform the described method steps, to direct the wired communications between the network controller and the endpoint device.

In various embodiments, some of the elements of the method shown may be performed concurrently, in a different order than shown, may be substituted for by other method elements, or may be omitted. Additional method elements may also be performed as desired. As shown, the method may operate as follows.

At 702, a plurality of channels are designated within a range of frequencies. Each of the plurality of channels includes a separate sub-band of frequency within the range of frequencies. As used herein, "channel" may be understood to refer to a specific range of frequencies that is utilized for a specific portion of upstream or downstream communications over a wired communication medium. For example, there may be a range of frequencies that are available for communications over a wired medium (e.g., a coaxial cable of PLC), and a plurality of channels may be designated for a respective plurality of frequency sub-bands within the range of frequencies. As one example, the majority of the spectrum up to 3 GHz (e.g., from 5 MHz to 3 GHz) may be available for wired communications (e.g., as illustrated in FIG. 2), and this frequency range may be divided into a plurality of frequency channels with equal bandwidth. Alternatively, a portion of the spectrum may be already reserved for other wired communications such as DOCSIS, and the range of frequencies corresponding to plurality of channels may be selected to avoid overlapping with the frequencies used for the other wired communications (e.g., as illustrated in FIG. 1). In other words, the sub-bands of the plurality of channels are selected to avoid overlapping bandwidth utilized by Data Over Cable Service Interface Specification (DOCSIS). Selecting the sub-bands of the plurality of channels to avoid overlapping bandwidth utilized by DOCSIS may involve selecting the sub-bands of the plurality of channels to occur at frequencies above a highest frequency utilized by DOCSIS plus a guard interval. In some embodiments, it may be determined that communications between the network controller and the endpoint device do not utilize DOCSIS. Based at least in part on determining that communications between the network controller and the endpoint device do not utilize DOCSIS, the sub-bands of the plurality of channels may be designated to span the entire available bandwidth of the coaxial cable.

At 704, a first subset of the plurality of channels are designated as upstream channels and a second subset of the plurality of channels are designated as downstream channels for communication with an endpoint device. For example, the first subset may include a plurality of frequency channels, and the second subset may include a plurality of frequency channels disjoint from the first subset.

In some embodiments, the first subset of the plurality of channels are designated as upstream channels and the second subset of the plurality of channels are designated as downstream channels based at least in part on upstream and downstream channel demand. For example, it may be determined how much channel demand is currently present in both the upstream and downstream directions, and the first and second subsets of the plurality of channels may be designated to accommodate the current channel demand. For example, if the endpoint device is currently performing a large quantity of upstream traffic, a larger subset of channels may be designated as upstream channels to accommodate this large quantity of traffic.

In some embodiments, the first and second subsets of the plurality of channels are designated by a device comprising a multi-parallel processor system. In these embodiments, different channels may be operated by different processors of the plurality of processors, and processor allocation for operating both upstream and downstream communications may be dynamically modified to accommodate current channel demand.

In some embodiments, designating the first subset of the plurality of channels as upstream channels and the second subset of the plurality of channels as downstream channels is performed further based at least in part on channel availability. For example, channel availability coupled with user demand may be utilized to shift the split between upstream and downstream frequency resource allocation. A first set of frame periods may experience greater downstream than upstream throughput demand, while another set of frame periods may experience greater upstream than downstream throughput demand. The split in bandwidth allocation may be disproportionate given differences in attenuation and/or ingress noise between different bands. For example, higher frequency bands incur greater attenuation, and these bands are often reserved for downstream communications because the network controller typically has access to greater transmission power than the endpoint device, such that the greater attenuation may be compensated for with an increased transmission power. For example, in a scenario where upstream and downstream communications have comparable demand, it may be desirable to allocate more than half of the available bandwidth for downstream communications if the downstream communications are performed on a higher frequency band with a larger attenuation than the upstream communications. In some embodiments, bandwidth allocation is designated as a dynamic system configuration, where the split between upstream and downstream is not pre-determined, but may be dynamically updated based on demand, attenuation, and/or noise levels, among other factors.

In some embodiments, one or more of a code rate and a modulation scheme for one or more of the plurality of channels is selected based on an attenuation level associated with the frequency range of the respective channel. For example, higher frequency ranges generally experience larger attenuation levels, and the code rate and/or the modulation scheme for communications on different channel may be modified to accommodate the variability in their respective attenuation levels. For example, a lower code rate and/or a more error-resistant modulation scheme may be selected for a channel at a frequency range with a larger attenuation levels, compared to a channel at a frequency range with a smaller attenuation level.

In some embodiments, a new first subset of the plurality of channels may be dynamically re-designated as upstream channels and/or a new second subset of the plurality of channels may be dynamically re-designated as downstream channels. In various embodiments, the re-designation may be dynamically performed based on current traffic conditions and/or a signal-to-interference-plus-noise-ratio (SINR) associated with the communications between the network controller and the endpoint device. For example, if the endpoint device alters the current relative amounts of upstream and downstream traffic (e.g., if the endpoint device initiates or terminates an application that utilizes a large amount of upstream or downstream traffic), the first and second subsets may be dynamically re-designated to accommodate the new traffic allocation. Dynamically re-designating the new first subset and the new second subset may be performed periodically with a predetermined periodicity. Dynamically re-designating the new first subset and the new second subset may be performed on a per-frame basis.

In some embodiments, communications with the endpoint device may utilize virtual segmentation over a coaxial cable. Alternatively, the communications may be performed over a PLC, a telephone line-based twisted-pair copper line, or another type of wired communication medium, according to various embodiments. The endpoint device may be a remote PHY device (RPD), a smart television, computer, laptop, smart phone, or another type of device.

In some embodiments, a third subset of the plurality of channels may be designated as exclusion and/or guard bands. For example, as illustrated in FIGS. 1-2, exclusion and/or guard bands may be designated between the subset of channels used for upstream traffic, the subset of channels used for downstream traffic, and/or the subset of frequencies used for other communications such as DOCSIS. The exclusion and/or guard bands may serve to reduce interference between, e.g., the upstream and downstream traffic.

In some embodiments, the exclusion and/or guard bands may allow for high fidelity communications without employing a diplexer to avoid interference between channels. For example, diplexers are typically deployed as fixed-frequency devices, which reduce interference between channels at a pre-determined and fixed frequency range. While diplexers may be effective, they are limited in flexibility and may not be able to accommodate dynamic allocation of the frequency boundary between upstream and downstream communications. To address these and other concerns, in some embodiments exclusion and/or guard bands may be used to avoid or reduce interference between channels, and the location of the exclusion and/or guard bands may be dynamically adjusted to accommodate dynamic allocation of the frequency boundary between upstream and downstream channels.

The sub-bands of the plurality of channels may be selected to extend to an upper band edge of the coaxial cable. The sub-bands of each of the plurality of channels may be selected to increase channel utilization of the range of frequencies. For example, the sub-bands may be selected to utilize a substantial portion of the available range of frequencies of the communication medium.

At 706, communications are performed between a network controller and the endpoint device by utilizing the plurality of channels. The communications may be performed through a coaxial cable, or they may be performed through a PLC, a telephone line-based twisted-pair copper line, or another type of wired communication medium, in various embodiments. The upstream communications may utilize the first subset of channels and may be directed by a first set of processing resources of a parallel processor system, while the downstream communications may utilize the second subset of channels and may be directed by a second set of processing resources of the parallel processor system. In some embodiments, the communications are performed by a VS repeater, and may include receiving upstream and/or downstream communications, performing back-to-back analog-to-digital conversion followed by digital-to-analog conversion (e.g., as illustrated in FIG. 6), and subsequently transmitting the communications upstream and/or downstream through the wired communication medium. Alternatively or additionally, the communications may be performed by the network controller and/or the endpoint device, in which case only one of digital-to-analog or analog-to-digital conversion may be performed for each of upstream and downstream communications, as illustrated in FIG. 6.

In some embodiments, the wired communications device may further include a wireless radio coupled to one or more processors of the wired communications device. In these embodiments, the wired communications device may be further configured to host an auxiliary service such as functioning as a Wi-Fi hotspot, a small cell base station, and/or a mobile backhaul transceiver, as illustrated in FIG. 5. The wired communications device may utilize the radio to host the wireless auxiliary service, and the wireless auxiliary service may provide one or both of wired-to-wireless and wireless-to-wired communication interworking. For example, a VS repeater device may receive upstream and/or downstream communications, and may convert the communications from the wired communication medium to a wireless communication medium corresponding to the auxiliary service. Alternatively or additionally, the VS repeater device may receive wireless communications through the wireless communication medium and may convert and transmit them according to the wired communication medium. The communications may thereby by rerouted from the wired communication medium to a wireless communication medium, or vice versa, and communications may be received from and transmitted to a remote wireless device such as a user equipment (UE) device.

VS System Parameters

This section provides an example set of system parameters for implementing embodiments described herein. The specific parameters cited are exemplary, and are not intended to limit the scope of the disclosure. For example, any of a variety of different parameters may be utilized, e.g., different modulation schemes and channel coding methods may be used.

As one example, the channel bandwidth may be defined in steps of 24 MHz as follows:

$B_{CH} = m \cdot 24$ MHz, $m = 1, 2, \ldots, 8$

A 1 MHz guard band may be included at either band edge, providing for example 22 MH-z carrying capacity in a 24 MHz channel or 190 MHz carrying capacity in a 192 MHz channel. The VS band start may be assigned based on the presence or absence of DOCSIS (plus a guard interval if applicable):

$$B_{start} = \begin{cases} 5 \text{ MHz}, & DOCSIS \text{ absent} \\ \begin{bmatrix} 860, 1002, \\ 1218, 1794 \end{bmatrix} \text{ MHz}, & DOCSIS \text{ present} \end{cases}$$

$B_{stop} = 3$ GHz

In some embodiments, channels may be assigned from the band start frequency, $B_{start}$, and channel bandwidths may be adjusted to reduce unused spectrum as the allocation approaches the band stop frequency, $B_{stop}$. Frequency division multiplexing may be utilized for both upstream and downstream communications, adjusting the resource allocation as desired to accommodate variations in the respective bandwidth demands. Time division multiplexing may be employed to enable additional endpoints in a point-to-multipoint arrangement. Use of full-duplex may be reserved to enable simultaneous US/DS transport in designated subbands, as desired. Designated exclusion and guard bands may be dormant as desired, based on the US/DS split and the observed occurrence of ingress noise.

One example of assigned OFDM parameters are presented below:

$\Delta f = 25, 50$ kHz $T_{FFT} = \dfrac{1000}{\Delta f} = 40, 20$ μs $N_{FFT} = 8192.4096$ samples Further, the guard intervals may be employed as follows:
$N_{CP}$=192, 256, 512, 768, 1024 samples
$N_{WIN}$=0, 64, 128, 192, 256 samples
Additionally or alternatively, modulation and coding per channel may be assigned based on channel capacity as a function of frequency.
Modulation: 256-QAM, 512-QAM, 1024-QAM, . . .
Channel Coding: LDPC, Polar
Block Size: 16200 bits
Code Rate: 11/15, 12/15, 13/15
Frame periodicity may be set in whole symbols (including the guard interval) up to $T_{frame}$≅1 ms, and the system parameter update rate may be determined including channel assignments, OFDM parameters, guard interval, modulation and coding, and the US/DS split on a per frame basis. Other numerology configurations may be used based on different parameter selections.

Parallel Processor System

Figure 8:
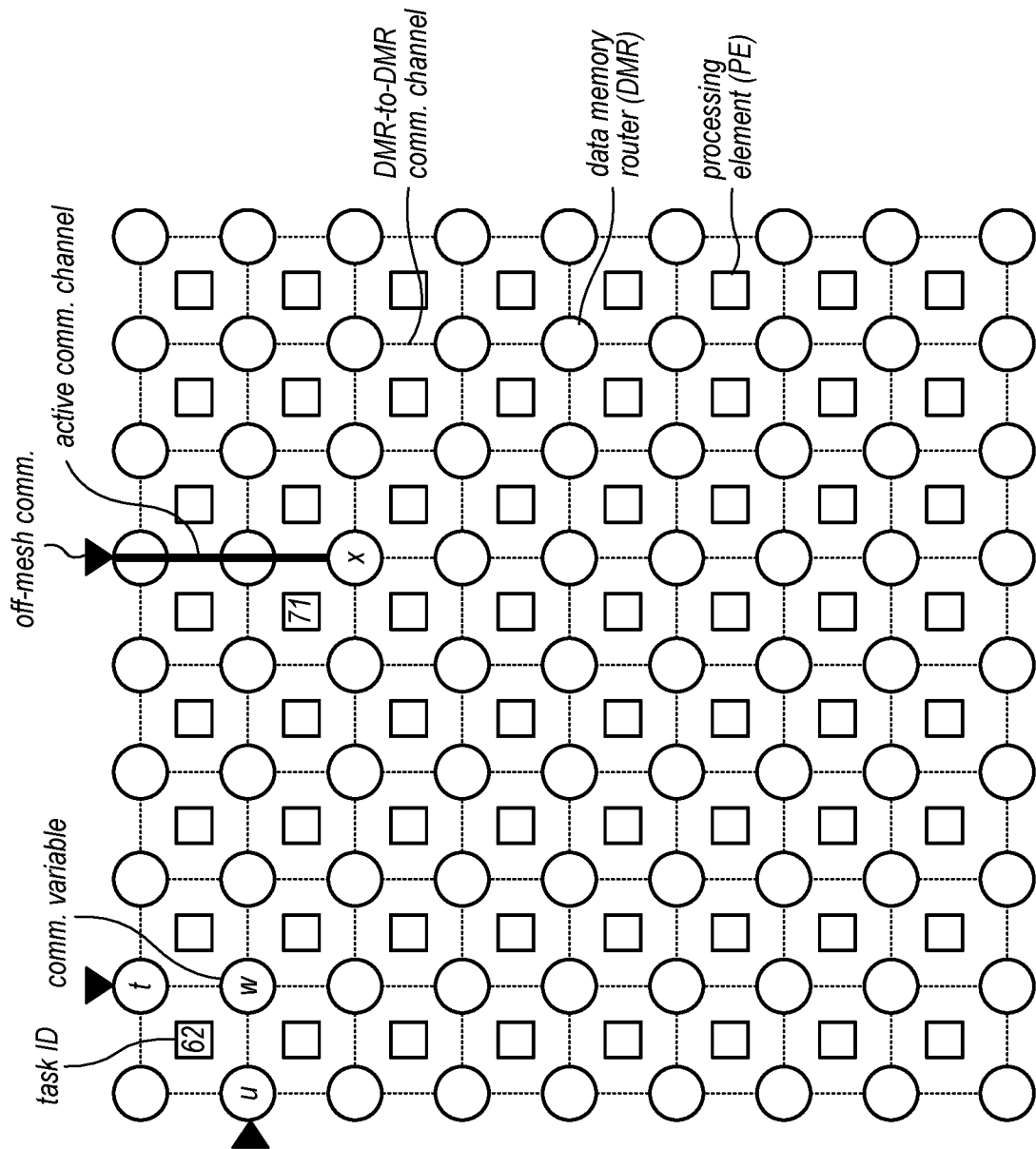
FIG. 8 illustrates an example parallel processor system that may be present in a wired communication device, according to some embodiments.

FIG. 8 illustrates an example parallel processor system that may be present in a wired communication device, according to some embodiments. In this example, the processor system may comprise a plurality of interspersed processors and memories, as shown where the rectangles are processing elements (also called functional units) and the circles are memories, also referred to as data memory routers. The processor system may be programmed to implement the methods described herein. For more information on an example processor system architecture which may be used in some embodiments, please see U.S. Pat. Nos. 7,415,594 and 8,880,866, which are hereby incorporated by reference in their entirety as though fully and completely set forth herein Another example of a processor system is a programmable hardware element (PHE) as defined above. For example, the decoder may include a PHE, such as an FPGA, which may be configured to implement the methods described herein.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for performing virtual segmentation to service an endpoint device, the method comprising:
   by a virtual repeater station located between the endpoint and a cable headend:
     designating, by the virtual repeater station, a plurality of channels within a range of frequencies, wherein each of the plurality of channels comprises a separate respective sub-band of frequency within the range of frequencies, wherein the separate sub-bands of frequency are selected to occur at frequencies above a highest frequency utilized by Data Over Cable Service Interface Specification (DOCSIS) plus a guard interval;
     designating, by the virtual repeater station, a first subset of the plurality of channels as upstream channels and a second subset of the plurality of channels as downstream channels for the virtual segmentation; and
     performing, by the virtual repeater station, communications between a network controller and the endpoint device through a coaxial cable by utilizing the plurality of channels,
     wherein the first subset of the plurality of channels are designated as upstream channels and the second subset of the plurality of channels are designated as downstream channels based at least in part on upstream and downstream channel demand.

2. The method of claim 1,
wherein one or more of a code rate and a modulation scheme for one or more of the plurality of channels is selected based on an attenuation level associated with the sub-band of frequency of the respective channel.

3. The method of claim 1,
wherein designating the first subset of the plurality of channels as upstream channels and the second subset of the plurality of channels as downstream channels is performed further based at least in part on upstream and downstream channel availability.

4. The method of claim 1,
wherein the sub-bands of the plurality of channels are selected to avoid overlapping bandwidth utilized by the DOCSIS.

5. The method of claim 4,
wherein selecting the sub-bands of the plurality of channels to avoid overlapping bandwidth utilized by the DOCSIS comprises selecting the sub-bands of the plurality of channels to occur at the frequencies above h highest frequency utilized by the DOCSIS plus the guard interval.

6. The method of claim 5,
wherein the sub-bands of the plurality of channels are selected to extend to an upper band edge of the coaxial cable.

7. The method of claim 1,
wherein the sub-bands of each of the plurality of channels are selected to increase channel utilization of the range of frequencies.

8. The method of claim 1, the method further comprising:
dynamically re-designating a new first subset of the plurality of channels as upstream channels and a new second subset of the plurality of channels as downstream channels based at least in part on one or more of:
current traffic conditions; and
a signal-to-interference-plus-noise-ratio (SINR) associated with the communications between the network controller and the endpoint device.

9. The method of claim 8,
wherein said dynamically re-designating the new first subset and the new second subset is performed periodically with a predetermined periodicity.

10. The method of claim 8,
wherein said dynamically re-designating the new first subset and the new second subset is performed on a per-frame basis.

11. The method of claim 1, the method further comprising:
designating a third subset of the plurality of channels as exclusion and/or guard bands.

12. A method for performing virtual segmentation, the method comprising:
by a virtual repeater station located between an endpoint device and a cable headend:
designating, by the virtual repeater station, a plurality of channels within a range of frequencies, wherein each of the plurality of channels comprises a separate respective sub-band of frequency within the range of frequencies, wherein the separate sub-bands of frequency are selected to occur at frequencies above a highest frequency utilized by Data Over Cable Service Interface Specification (DOCSIS) plus a guard interval;
designating, by the virtual repeater station, a first subset of the plurality of channels as upstream channels and a second subset of the plurality of channels as downstream channels for communication with the endpoint device; and
performing, by the virtual repeater station, communications between a network controller and the endpoint device by utilizing the plurality of channels,
wherein designating the first subset of the plurality of channels as upstream channels and the second subset of the plurality of channels as downstream channels is performed based at least in part on upstream and downstream channel demand.

13. The method of claim 12,
wherein performing communications between the network controller and the endpoint device comprises performing analog-to-digital conversion followed by digital-to-analog conversion for the upstream channels and the downstream channels.

14. The method of claim 12,
wherein designating the first subset of the plurality of channels as upstream channels and the second subset of the plurality of channels as downstream channels is performed further based at least in part on upstream and downstream channel availability.

15. The method of claim 12, the method further comprising:
dynamically re-designating a new first subset of the plurality of channels as upstream channels and a new second subset of the plurality of channels as downstream channels based at least in part on one or more of:
current traffic conditions; and
a signal-to-interference-plus-noise-ratio (SINR) associated with the communications between the network controller and the endpoint device.

16. A wired communication device, comprising:
a non-transitory computer-readable memory medium;
one or more processors, wherein the wired communication device comprises a virtual repeater station located between an endpoint and a cable headend, wherein the virtual repeater station is configured to:
designate a plurality of channels within a range of frequencies, wherein each of the plurality of channels comprises a separate respective sub-band of frequency within the range of frequencies, wherein the separate sub-bands of frequency are selected to occur at frequencies above a highest frequency utilized by Data Over Cable Service Interface Specification (DOCSIS) plus a guard interval;
designate a first subset of the plurality of channels as upstream channels and a second subset of the plurality of channels as downstream channels for virtual segmentation; and
perform communications between a network controller and the endpoint device through a coaxial cable by utilizing the plurality of channels,
wherein the first subset of the plurality of channels are designated as upstream channels and the second subset of the plurality of channels are designated as downstream channels based at least in part on upstream and downstream channel demand.

17. The wired communication device of claim 16,
wherein one or more of a code rate and a modulation scheme for one or more of the plurality of channels is selected based on an attenuation level associated with the frequency range of the respective channel.

18. The wired communication device of claim 16, further comprising:
a radio coupled to the one or more processors, wherein the wired communication device is further configured to:
utilize the radio to host a wireless auxiliary service, wherein the wireless auxiliary service provides one or both of wired-to-wireless and wireless-to-wired communication interworking.

19. The wired communication device of claim 18,
wherein the auxiliary service comprises one of:
a WiFi hotspot;
a small cell base station; or
a mobile backhaul service.

* * * * *

UNITED STATES PATENT AND TRADEMARK OFFICE
CERTIFICATE OF CORRECTION

PATENT NO. : 11,228,339 B2  
APPLICATION NO. : 16/781099  
DATED : January 18, 2022  
INVENTOR(S) : Kevin A. Shelby and Michael B. Doerr Page 1 of 1

It is certified that error appears in the above-identified patent and that said Letters Patent is hereby corrected as shown below:

In the Claims

Claim 5, Column 14, Line 41, please delete "h" and substitute -- the --.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*